No. 722,514. PATENTED MAR. 10, 1903.
J. F. JOHNSON.
ROLLER RACK.
APPLICATION FILED NOV. 11, 1902.
NO MODEL.
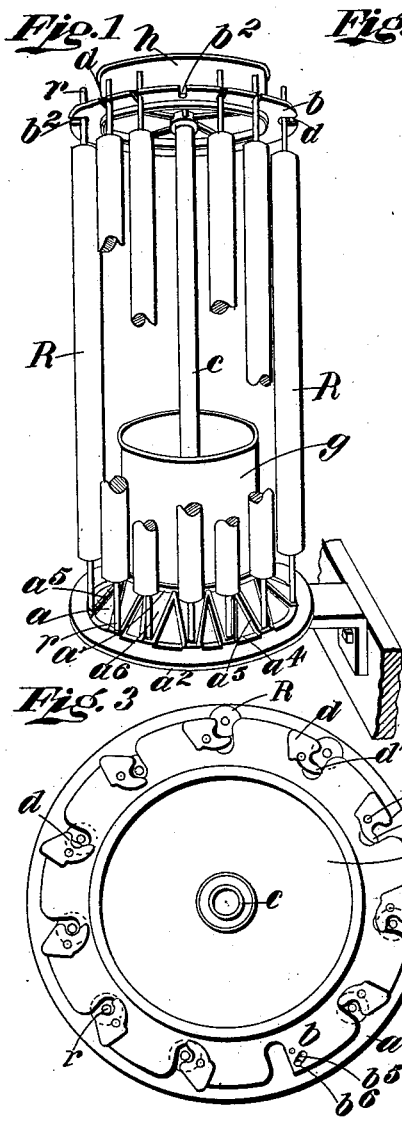
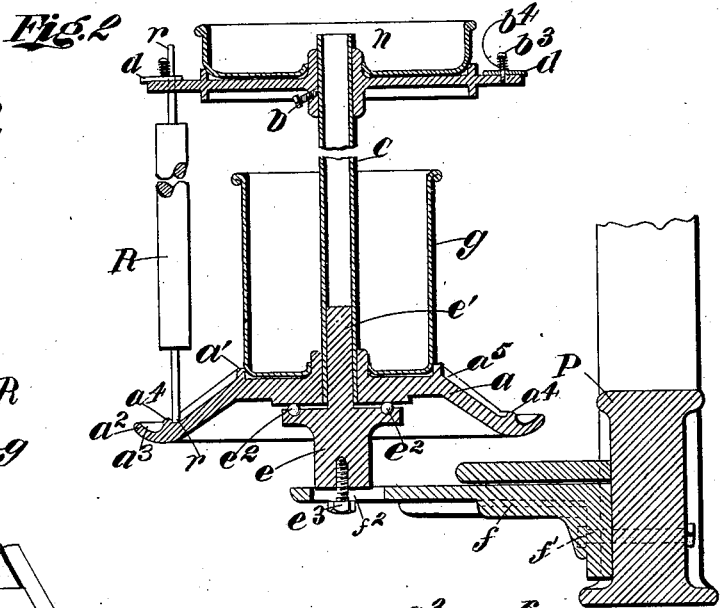
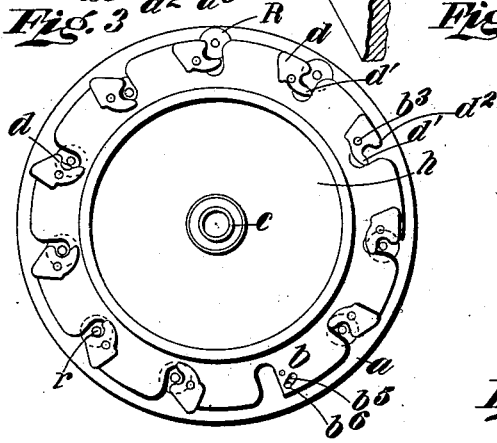
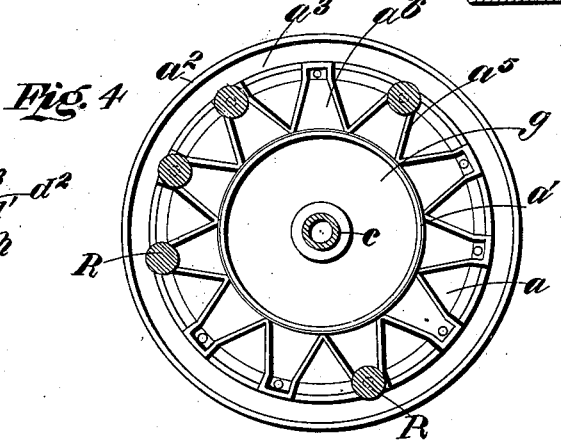
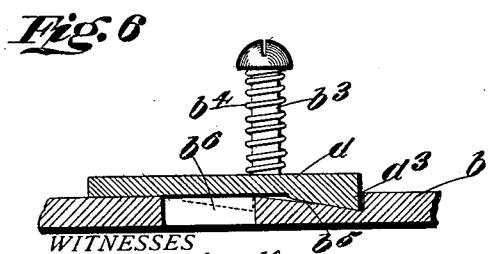
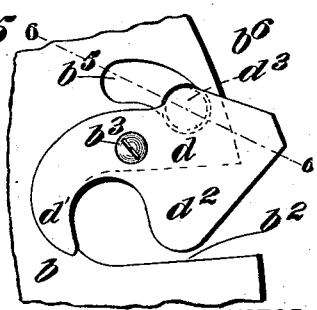
WITNESSES
C. Edward Duffey
James R. Mansfield
INVENTOR
John F. Johnson
By
Alexander & Dowell
Attorneys

UNITED STATES PATENT OFFICE.

JOHN F. JOHNSON, OF BATTLECREEK, MICHIGAN.

ROLLER-RACK.

SPECIFICATION forming part of Letters Patent No. 722,514, dated March 10, 1903.

Application filed November 11, 1902. Serial No. 130,917. (No model.)

*To all whom it may concern:*

Be it known that I, JOHN F. JOHNSON, of Battlecreek, in the county of Calhoun and State of Michigan, have invented certain new and useful Improvements in Roller-Racks; and I hereby declare that the following is a full, clear, and exact description thereof, reference being had to the accompanying drawings, which form part of this specification.

This invention is an improved printer's roller frame or rack for inking-rollers of printing-presses adapted to hold a number of such rollers when removed from the press and particularly designed for use in washing or cleaning such rollers.

The object of the invention is to provide a printer's roller frame or rack which can be attached to the press-frame, if desired, or placed at a convenient point beside the press, so that the pressman or cleaner can remove the inking-rollers from the press and place them in an upright position upon the rack, clean the same, and return them to the press with the least exertion and great rapidity.

The rack is so constructed that the rollers can be retained thereon in vertical position and readily removed and replaced, and the rack may be rotated, so that the operator can place or remove or clean all the rollers thereon without having to walk around the rack to do so. The rack is also provided with conveniently-located receptacles for containing the cleaning materials and also for waste.

While primarily designed to be used in the cleaning of the rollers, the rack is also quite useful for stacking the rollers while the press is out of operation, keeping them in a compact readily-accessible condition. The rack occupies very little floor-space, which is a decided advantage in press-rooms, and the rollers do not have to be carried any distance between the rack and the press. They are less liable to injury in handling, and a saving of time and labor of the operator is effected.

In the accompanying drawings I have illustrated an efficient form of the rack and will now describe the invention as illustrated therein, but refer to the claims following this detailed description for summaries of the various features and combinations of parts which I claim as my invention, and for which I desire protection.

In said drawings, Figure 1 is a side elevation of the rack, with inking-rollers supported thereon. Fig. 2 is an enlarged vertical central section through the rack. Fig. 3 is a top plan view thereof. Fig. 4 is a transverse section looking downward, showing the bottom plate. Fig. 5 is an enlarged view of one of the roller retainers or catches on the upper plate of the rack; and Fig. 6 is a detail section on line 6 6, Fig. 5.

As shown in the drawings, the rack comprises a bottom plate $a$ and a top plate $b$, connected by a central standard $c$, which is preferably tubular. The plate $b$ is adjustable on the standard $c$, so that it can be raised or lowered thereon in relation to plate $a$ and may be secured in the position to which it is adjusted by means of screw $b'$ or other suitable fastening.

The plate $a$ is a short flat-topped frustum of a cone in shape having an angular flange $a'$ at its top and an upturned flange $a^2$ around its lower edge, which forms a channel $a^3$, which will catch and retain dripping fluids. It also has a flange $a^4$ at the inner side of the channel $a^3$, and on the inclined surface of the plate $a$, between flanges $a'$ and $a^4$, are a series of ribs $a^5$. The alternate ribs $a^5$ slant in opposite directions and divide the surface of the plate $a$ into a series of V-shaped spaces $a^6$. The object of these ribs $a^5$ is to direct the lower end of journal $r$ of any inking-roller R, which is placed upon any space $a^6$ of the base-plate $a$ into correct position thereon, as indicated in the drawings, so that the operator does not have to be particularly careful in placing the rollers on the base-plate, the weight of the rollers and the inclination of the base-plate assisting in properly positioning the rollers R upon the base-plate.

The top plate $b$ is provided with a peripheral series of notches $b^2$, each arranged directly over one of the spaces $a^6$ on the base-plate $a$. Pivoted on the top plate $b$, near each notch $b^2$, is retainer $d$, which is provided with a finger $d'$, which when the plate is turned in one direction, will force the upper journal $r$ of a roller R out of the notch $b^2$. The retainer is also provided with a shoulder $d^2$, which, when the retainer is turned in the opposite direction will retain the roller-journal in the notch $b^2$. (See Fig. 3.)

The retainers $d$ are pivoted on pins $b^3$, which are attached to the top of plate $b$, and springs $b^4$ are interposed between the heads of pins $b^3$ and retainers $d$ to press the latter downward. Each retainer is provided on its under side with a bevel-lug $d^3$, which when the finger $d'$ is moved outward, so as to eject a roller from the slot, will engage an inclined notch $b^5$ in the plate $b$, adjacent to the notch, and when the retainer is moved inwardly, so that shoulder $d^2$ will lock the roller-journal in the slot, the lug $d^3$ engages a notch or opening $b^6$ in the plate and locks the retainer in position to retain the roller-journal in the notch.

The press-rollers R are of ordinary construction, and their shafts or journals $r$ are of such size that they readily enter notches $b^2$ in top plate $b$, as indicated in the drawings.

The rack may be supported in any suitable manner. Preferably I employ a stand $e$, provided with a central upstanding journal-pin $e'$, which passes through the hub of base-plate $a$ and into the lower end of tube $c$. Ball-bearings $e^2$ may be interposed between the top of stand $e$ and the bottom of base-plate $a$, as indicated in the drawings. This stand $e$ may be attached directly to the floor in any desired location; but I preferably attach it to the frame P of the press by means of a bracket $f$, which is rigidly bolted to the frame P, as indicated at $f'$, Fig. 2, and is provided with a slot $f^2$, through which passes a vertical bolt $e^3$, which engages a threaded socket in the lower end of stand $e$, thus fixedly, but adjustably, securing the rack to the press. I preferably attach the bracket $f$ to the press-frame at a point near the inking-rollers, so that the latter can be conveniently removed from the press to the rack or from the rack to the press with least labor and inconvenience to the operator.

A receptacle $g$ may be placed upon the base-plate $a$ within the flange $a'$ and surrounding standard $c$, as indicated in the drawings. Such receptacle is a very convenient holder for the materials and cloths used in cleaning the inking-rollers. Another receptacle $h$ may be supported upon the top plate $b$ and is used to contain the soiled cloths or waste used in cleaning the rollers.

When it is desired to clean the press-rollers, the pressman removes them from their bearings in the press and stands them upright upon the rack, letting the lower end of each roller rest on the base-plate in one of the spaces $a^6$. He then presses the upper journal $r$ of the roller into the notch $b^2$ in the plate $b$, and the roller-journal presses against finger $d'$ of the retainer and turns the latter on its pivot, so that as the journal $r$ enters the notch the shoulder $d^2$ of the retainer follows it, and lug $d^3$ of the retainer, engaging opening on notch $b^6$, locks the retainer in position to hold the inking-roller journal in the notch $b^2$. The lower end of the inking-roller slips by gravity into position against the flange $a^4$ on the base-plate, as indicated in the drawings. The rack is turned by the operator as he places the rollers thereon. After removing the rollers from one end of press the operator steps around to the other side of the rack and in like manner removes the rollers from that end of the press and places them upon the rack.

The cleaner having the rollers before him in the most convenient position can readily wipe the ink therefrom, the materials and cloths for this purpose being conveniently at hand in the receptacle $g$, and the soiled waste he can throw into receptacle $h$ to be removed at leisure. Any ink or fluids dropping from the rollers upon the base-plate $a$ will be caught and retained by the channel $a^3$ instead of dropping on the floor, from whence it can be subsequently removed. The cleaned rollers may remain in position on the rack until it is necessary to use them. In removing the rollers the operator simply grasps the upper journal of the roller and then presses its retaining-plate $d$ upwardly, so as to disengage lug $d^3$ from the notch or slot $b^6$, and then by pulling outward on the roller or turning the retainer $d$ the shaft of the roller is disengaged from the notch $b^2$ and the roller can be readily removed.

From the foregoing description it will be obvious that the invention is of great utility and convenience, as it requires very little room and greatly reduces the labor and time ordinarily required in cleaning press-rollers.

Having thus described my invention, what I claim as new, and desire to secure by Letters Patent, is—

1. A rack for printers' rollers having a base-plate, a top plate provided with a series of notches, retainers on the top plate beside the notches therein provided with fingers adapted to eject the roller-shafts from the notches when the retainers are turned in one direction, and spring-controlled devices for holding said retainers in position to retain the roller-journals.

2. A rack for printers' rollers having a base-plate provided with a series of divisions, a top plate provided with a series of notches one for each division of the base-plate, and spring-controlled retainers beside the notches provided with fingers adapted to eject the roller-shafts from the notches when the retainers are turned in one direction, and with shoulders to retain the roller-shafts in the notches when the retainers are turned in the opposite direction, and devices for holding said retainers in their open or closed positions.

3. A rack for printers' rollers comprising a conical base-plate having a series of roller-guiding spaces on its exterior, an upright connected with said base-plate, a top plate connected with said upright having a series of notches adapted to receive the upper ends of printing-rollers supported upon the base-plate, and a retaining-plate attached to said top plate beside the notches for holding the roller-journals on the notches.

4. A rack for printers' rollers comprising a conical base-plate having a series of oppositely-inclined flanges on its exterior, a shaft connected with said base-plate, a top plate connected with said shaft and having a series of notches adapted to receive the upper ends of printing-rollers supported upon the base-plate, a retaining-plate pivoted to said top plate beside each notch, and means for automatically holding said retaining-plates either in their opened or closed positions.

5. A rack for printers' rollers comprising a base-plate adapted to support the lower ends of printers' rollers stood vertically thereupon, a top plate provided with a series of notches adapted to receive the upper journals of said printers' rollers, a retainer beside each notch on the top plate, a spring for pressing said retainers against the top plate, said retainers having lugs on their under surface adapted to engage openings or notches in the top plate to hold the retainer in position to retain the roller-journals in the notches, substantially as described.

6. In a rack for printers' rollers, the combination of a base-plate having a series of V-shaped spaces on its conical surface and an upstanding flange around its lower edge, said spaces being adapted to direct the lower journals of printers' rollers placed on the plate into proper position thereon; and a top plate adapted to retain the upper ends of the rollers in position.

7. In a printers' roller-rack the combination of the stand, a conical base-plate rotatably journaled thereon, said base-plate having divergent guide-flanges on its conical face, a central standard, a top plate adjustably connected to said standard and provided with a series of peripheral notches adapted to receive the upper edges of the printers' rollers supported on the base-plate, and spring-pressed retainers pivotally mounted on the top plate beside the notches.

8. In a rack for printers' rollers, the combination of a conical base-plate having a series of oppositely-inclined guide-flanges on its conical surface, and an upstanding flange around its lower edge, said inclined flanges being adapted to direct the lower journals of printers' roller placed on the plate into proper position thereon; a top plate provided with a series of notches adapted to receive the upper journals of the printing-rollers, and a spring-pressed retainer pivoted on the top plate beside each notch adapted to retain the upper journals of the rollers in the notches.

9. In a printers' roller-rack, the combination of the stand having an upstanding journal, the base-plate rotatably mounted on said journal provided with a channel at its base, and a central standard rising from said base-plate with a top plate mounted on said standard, said top plate having a series of notches in its periphery, a retainer pivotally mounted on the top plate beside each notch therein, springs for pressing said retainers against the top plate, whereby the retainers are held in position to confine the upper journals of printers' rollers, supported upon the base-plate, within the notches.

10. In a printers' roller-rack, the combination of a stand having an upstanding journal, a conical base-plate rotatably mounted on said journal provided with upstanding flanges at its base a channel between said flanges, and adjacent oppositely-inclined roller-journal guide-flanges, on its conical face; a standard rising from said base-plate, a top plate mounted on said standard having a series of notches in its periphery, retainer-plates pivotally mounted on the top plate beside the notches therein, and springs for pressing said retainers against the top plate whereby the retainers are held in position to confine the upper journal of printers' rollers supported upon the base-plate within the notches.

In testimony that I claim the foregoing as my own I affix my signature in presence of two witnesses.

JOHN F. JOHNSON.

In presence of—
SARA WATERS,
J. H. GREEN.